United States Patent
Small et al.

[11] Patent Number: 5,862,495
[45] Date of Patent: Jan. 19, 1999

[54] REAL TIME POSITION CORRECTION TO GROUND GENERATED SPACECRAFT EPHEMERIS

[75] Inventors: Hunt W. Small, Saratoga; John E. Bergesen, San Bruno; Brian J. Howley, Mountain View, all of Calif.

[73] Assignee: Lockheed Martin Corp., Sunnyvale, Calif.

[21] Appl. No.: 714,329

[22] Filed: Sep. 18, 1996

[51] Int. Cl.$^6$ .................................................. G06F 7/70
[52] U.S. Cl. ...................... 701/13; 701/221; 701/226; 244/164; 244/165; 342/352; 342/354
[58] Field of Search .................... 701/13, 14, 15, 701/16, 117, 120, 122, 226, 300, 301, 302; 244/135 A, 161, 186, 177, 194, 195, 164, 183, 167, 158 R, 165, 169; 73/178 R; 342/352, 354, 355, 413

[56] References Cited

U.S. PATENT DOCUMENTS

| | | | |
|---|---|---|---|
| 4,442,491 | 4/1984 | Olhausen, Jr. | 701/221 |
| 4,912,475 | 3/1990 | Counselman, III | 701/226 |
| 4,939,663 | 7/1990 | Baird | 701/208 |
| 5,109,346 | 4/1992 | Wertz | 701/226 |
| 5,430,657 | 7/1995 | Kyrtsos | 701/226 |
| 5,528,502 | 6/1996 | Wertz | 701/226 |

Primary Examiner—Jacques H. Louis-Jacques
Attorney, Agent, or Firm—Feix & Feix

[57] ABSTRACT

Real time correction to ground generated satellite ephemeris implements a reference trajectory management module (334), an error estimation module (336), an parameter calculation module (338) and a position information management module (340). The reference trajectory management module (334) accesses reference trajectory data such as ground generated ephemeris data which is uplinked to a spacecraft through a communications unit (312). The position information management module (340) accesses and interprets position information such as Global Positioning System (GPS) measurement data to provide measured spacecraft positions. The parameter calculation module (338) calculates spacecraft position and velocity from the reference trajectory data. The error estimation module (336) compares the measured and calculated positions to provide a position difference, smoothes the position difference to filter anomalous data, and provides a correction term for the determination of corrected spacecraft orbital parameters such as position and velocity. The time rate of change of the correction term may be used to provide additional correction to the orbital parameters.

9 Claims, 7 Drawing Sheets

REAL TIME POSITION CORRECTION TO GROUND GENERATED SPACECRAFT EPHEMERIS

TECHNICAL FIELD

The present invention relates generally to accurate orbital parameter determination and more particularly to a system, apparatus and method for real time on-board position correction of spacecraft ephemeris.

BACKGROUND ART

The competing needs for accuracy and reduced computational overhead have presented problems in orbital parameter determination. Traditionally, either ephemeris data or information supplied by position measuring satellites have been independently used to determine orbital parameters such as spacecraft position and velocity.

Ephemeris data may be a tabulation of estimated orbital object positions at discrete instants in time which are used as a reference trajectory for predicting orbital parameters such as position and velocity. A large number of measurements and very sophisticated models can gene rate an extremely accurate ephemeris, but the computational overhead required for such accuracy makes it impractical to store it aboard orbital objects such as spacecraft. Additionally, even the most accurate ephemeris progressively loses accuracy with time because the forces influencing orbital motion are not precisely known. Specifically, unpredicted changes in the orbital perriod due to factors including atmospheric drag fluctuation tend to significantly affect the in-track component of reference trajectories.

Position information may also be used to determine orbital parameters. For example, a Global Positioning System ("GPS") receiver may be used to determine spacecraft position from signals transmitted from GPS satellites to the GPS receiver. Accuracy is adversely affected by factors such as the position and orientation of the spacecraft relative to the GPS constellation of satellites, GPS constellation position and timing errors, signal propagation errors, and internal receiver noise and timing errors. Additionally, GPS receivers are subject to Selective Availability ("S/A") which intentionally degrades signals and adds GPS satellite position and constellation timing errors. Each of these factors can cause positional error spikes in the position information.

Spacecraft position determination based solely upon GPS receiver outputs is also deficient because data output rates (typically 1 per second) are often too slow for spacecraft maneuvering. Additionally, GPS position estimates may not be available during maneuvers since GPS availability depends upon the antenna location and orientation of the spacecraft.

Sophisticated processes for GPS error correction such as those using full orbital state and Kalman filtering may be impractical because the extent of data collection, complex software and high precision arithmetic operations require high computational overhead and may prevent real-time processing. Additionally, such processes remain adversely affected by S/A errors since such errors are very difficult to predict.

Thus, there remains a need for real time orbital parameter determination with low computational overhead, high accuracy and S/A error mitigation.

SUMMARY OF THE INVENTION

The present invention overcomes the limitations and shortcomings of the prior art with an apparatus and method for real time correction of orbital parameters such as on-board spacecraft position and velocity determination.

In accordance with the present invention, a reference trajectory management module (334) accesses reference trajectory data such as by uplinking (312) ground generated ephemeris data. The reference trajectory data is used by a parameter calculation module (338) for on-board determination of spacecraft orbital parameters such as position and velocity. A position information receiver (310) such as a GPS receiver is used by a position information management module (340) to provide a measured position of the spacecraft. For example, a measured spacecraft position corresponding to a first time may be provided. The parameter calculation module (338) then determines, preferably by interpolation using the reference trajectory data, the position of the spacecraft corresponding to the first time. The error estimation module (336) compares the determined and measured positions to provide a correction term to the parameter calculation module (338).

In further accord with the present invention, the difference between an interpolated and measured spacecraft position at the first time is used to calculate a position error vector. An in-track component of the position error vector, which is the portion of the position error vector which is parallel to the reference trajectory, is determined and the in-track component is then used to determine an interpolation correction term.

In still further accord with the present invention further improvement in the determination of position and velocity is based upon the time rate of change of the interpolation correction term.

Using position information such as GPS data to provide a correction term for orbital parameter interpolation from reference trajectory data provides several advantages. First, since the bulk of computation may be undertaken infrequently on the ground to obtain the reference trajectory data, the computational overhead required on board for accurate orbital parameter determination is lowered. Additionally, since the reference trajectory degrades slowly over time and the GPS position information is used to correct such slow degradation, real time on-board orbital parameter determination may be provided without complex software. Furthermore, since the reference trajectory data may be easily interpolated over time, operations such as spacecraft maneuvering are not adversely affected by gaps and error spikes in the position information. Finally, the effect of position information error spikes such as those involving S/A may be easily screened or buffered, since the reference trajectory provides an accurate basis for comparison to the measured position.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
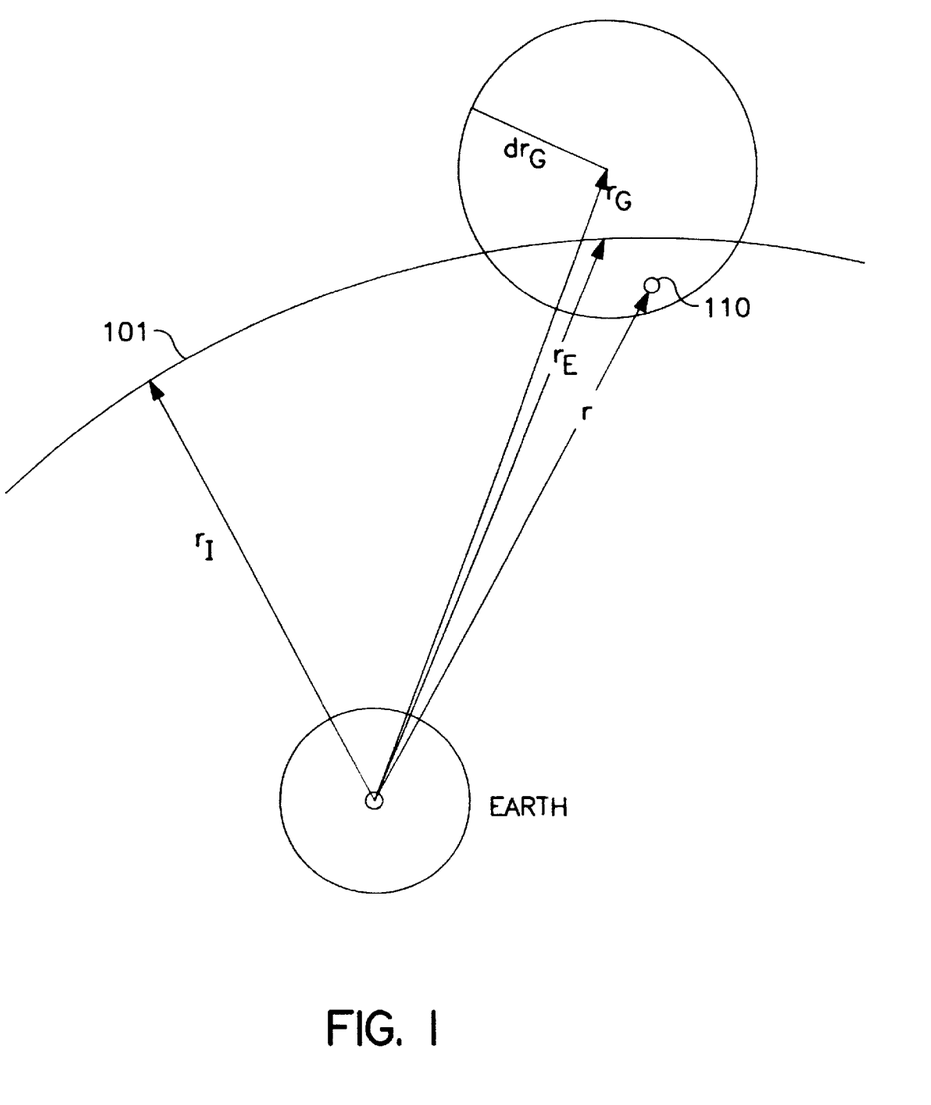
FIG. 1 is a schematic diagram illustrating orbital parameter correction in accordance with the present invention.

Referring now to FIG. 1, a diagram illustrating orbital parameter correction in accordance with the present invention includes a reference trajectory 101 which may be used to estimate the position of a spacecraft 110. Preferably, the reference trajectory 101 is based upon ephemeris data from which spacecraft position is interpolated. For example, a three dimensional vector $r_I$ represents an interpolated spacecraft position at time t. Additionally, a position information receiver such as a GPS receiver receives information from GPS satellites to provide a measured spacecraft position vector $r_G$ at the same time t accurate to within a known error $dr_G$. The difference between the measured position $r_G$ and the interpolated position $r_I$ is used to determine a corrected spacecraft position $r_E$ which more accurately approximates the actual spacecraft 110 position r. The in-track component of the difference (the component that is parallel to the reference trajectory 101) is used to calculate an interpolation correction term. Thus, the corrected spacecraft position $r_E$ is preferably an interpolated position which is corrected based upon the difference between the measured and interpolated positions. Additionally, iterative correction may be provided such that the corrected position $r_E$ is used as the interpolated position which is compared to the measured position $r_G$ to update the interpolation correction term.

Figure 2:
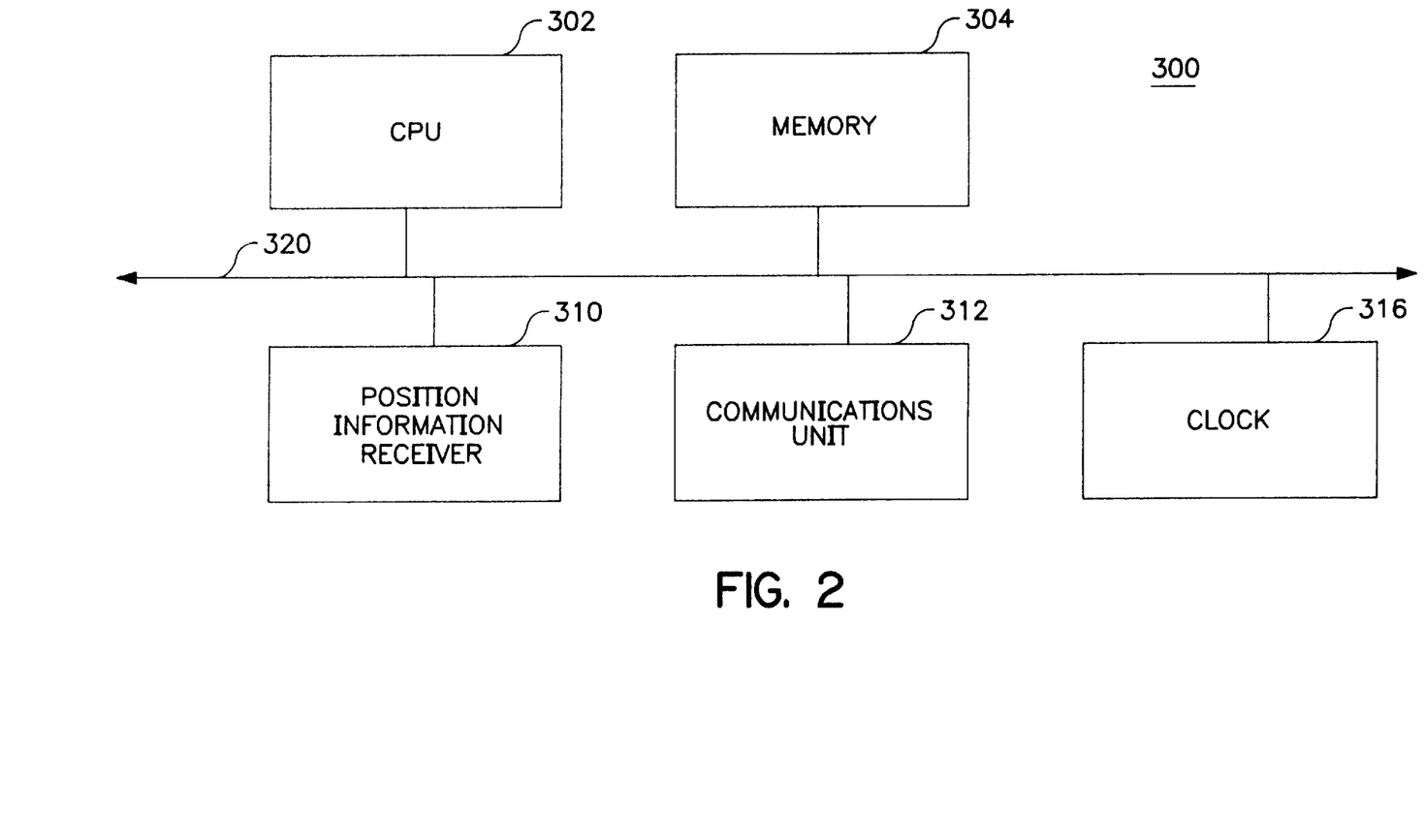
FIG. 2 is a block diagram illustrating a computer system constructed in accordance with an embodiment of the present invention.

Referring now to FIG. 2, an on-board spacecraft computer system 300 constructed in accordance with an embodiment of the present invention comprises a central processing unit (CPU) 302, a memory 304, a position information receiver 310, a communications unit 312, and a clock 316. The CPU 302 is connected by a bus 320 to the memory 304, position information receiver 310, communications unit 312, and clock 316 using a conventional architecture for facilitating communication between the various elements. Preferably, the CPU 302 is a conventional space qualified floating point processor and the memory 304 is a random access memory (RAM).

The position information receiver 310 is preferably a commercially available GPS receiver for determining spacecraft orbital parameters based upon signals transmitted by GPS satellites. The receiver 310 outputs comprise a position estimate with an associated time tag. Typically, the position estimate is given with respect to a predetermined frame of reference such as the World Geodetic System 84 ("WGS 84"), and the time is provided with respect to a reference such as Coordinated Universal Time ("UTC") or GPS time. It is understood that various position information systems, such as GLONASS, may be used in accordance with the present invention.

The clock 316 is preferably a high accuracy timing device for providing formatted timing data for the computer system 300. Preferably, the clock 316 estimates current time with respect to the time reference used by the position information receiver 310 and is capable of being synchronized according to the timing of the receiver 310.

The communications unit 312 facilitates communication between the computer system 300 and outside sources. The communications unit 312 is arranged to receive reference trajectory data from a ground (Earth) source and format the trajectory data for use by the system 300. Preferably, the reference trajectory data is ephemeris data which is intermittently uplinked to the spacecraft from a source external to the spacecraft so that processing resources are conserved.

The CPU 302, as directed by instructions received from the memory 304 as configured in accordance with the present invention, uses the data from the position information receiver 310 and ground generated reference trajectory data to determine corrected orbital parameters such as the position and velocity of the spacecraft.

Figure 3:
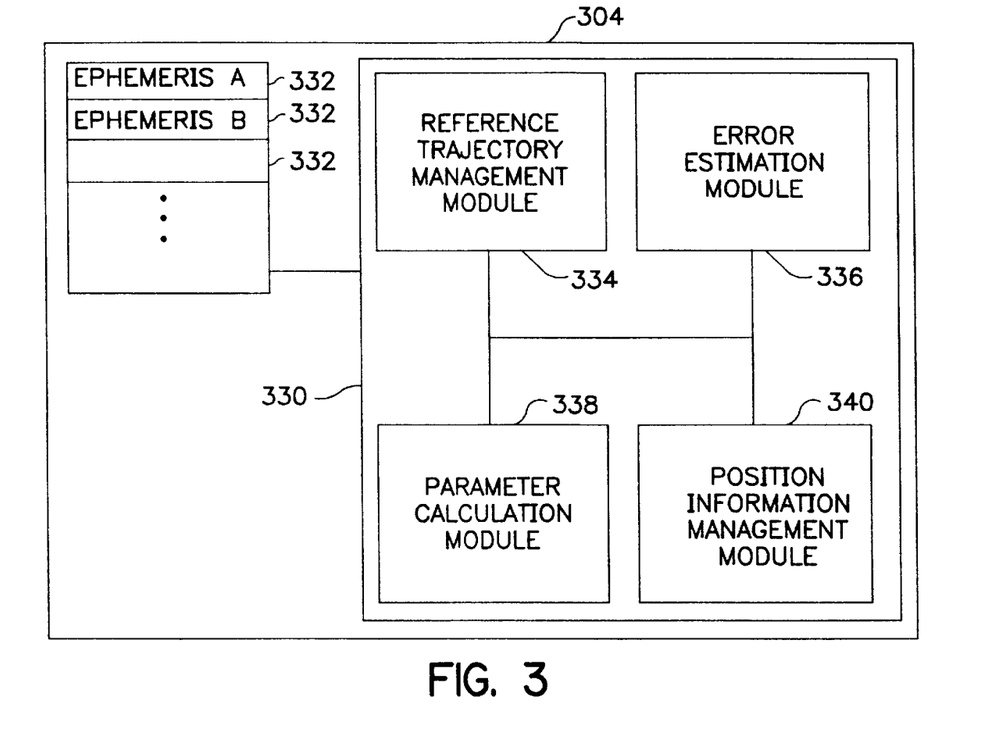
FIG. 3 is a block diagram illustrating a preferred embodiment of a memory in accordance with the present invention.

Referring now to FIG. 3, a preferred embodiment of the memory 304 in accordance with the present invention is shown to include data buffers 332 and parameter determination module 330. Module 330 is typically implemented in software, but can also be implemented in hardware or firmware. Preferably, the parameter determination software 330 provides corrected orbital parameters by interpolating spacecraft position from the ground supplied predicted orbital trajectory as a function of time, interpreting GPS measured position and time, computing the difference between the GPS measured and interpolated positions, smoothing the difference in position using a weighted average, and adjusting the calculated spacecraft position using the smoothed position difference. For these purposes, the parameter determination software 330 includes a reference trajectory management module 334, an error estimation module 336, a parameter calculation module 338, and a position information management module 340.

The reference trajectory management module 334 receives and permits access to ground generated ephemeris data which provides a reference trajectory, while coherent GPS measurement data is provided by the position information management module 340. The parameter calculation module 338 accesses the ephemeris data and interpolates spacecraft parameters, such as position and velocity, based upon the ephemeris data and time. The error estimation module 336 compares the interpolated position and the GPS measurement data to calculate a correction term which is provided to the parameter calculation module 338. The function of the modules 334, 336, 338, 340 is shown and described in further detail with reference to FIG. 5a.

The data buffers 332 maintain data for various parameter determination software 330 modules. For example, the data buffers 332 provide ephemerides for access by the reference trajectory management 334 and parameter calculation 338 modules. Preferably, two separate ephemerides are kept and maintained in different buffers such as those designated ephemeris A and ephemeris B. This facilitates the uplinking, through the communications unit 312, of slightly overlapping ephemeris data for on-board computational convenience and efficiency at ephemeris segment junctions. Thus, there is no need to interrupt processing while uplinking a new ephemeris. For example, if the usefulness of ephemeris A becomes exhausted, ephemeris B may be processed while a new ephemeris is uplinked. Additionally, while current ephemeris trajectory data is being used by the system 300, a resource external to the spacecraft such as a ground computer can generate ephemeris trajectory data for future use.

Figure 4:
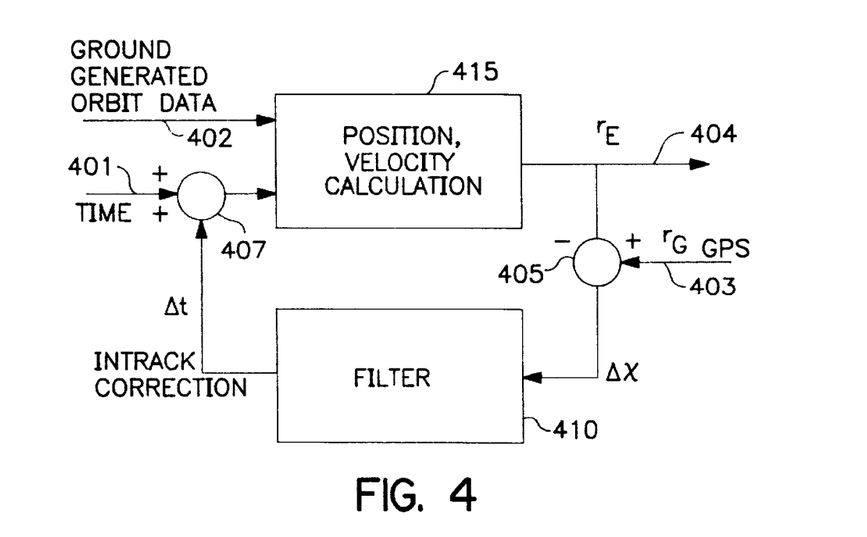
FIG. 4 is a schematic diagram illustrating a preferred embodiment of orbital parameter determination in accordance with the present invention.

Referring now to FIG. 4, a preferred embodiment of on-orbit spacecraft orbital parameter determination in accordance with the present invention uses ground generated trajectory data such as ephemeris data 402, position information such as GPS position information 403, and time 401 to calculate 415 a corrected spacecraft position $r_E$ output 404 for immediate use and for use in subsequent parameter calculations. The corrected position $r_E$ and other orbital parameters such as velocity are calculated 415 based upon time and a reference trajectory derived from the ephemeris data 402. The corrected position vector $r_E$ and a measured position vector $r_G$ corresponding to discrete times ti are determined and the two vectors are compared 405 to provide a position error vector. The in-track component $\Delta x$ of the position error is determined and filtered 410 to provide an interpolation correction term $\Delta t$ which is used to adjust 407 the time argument used for calculating 415 position.

Figure 5A:
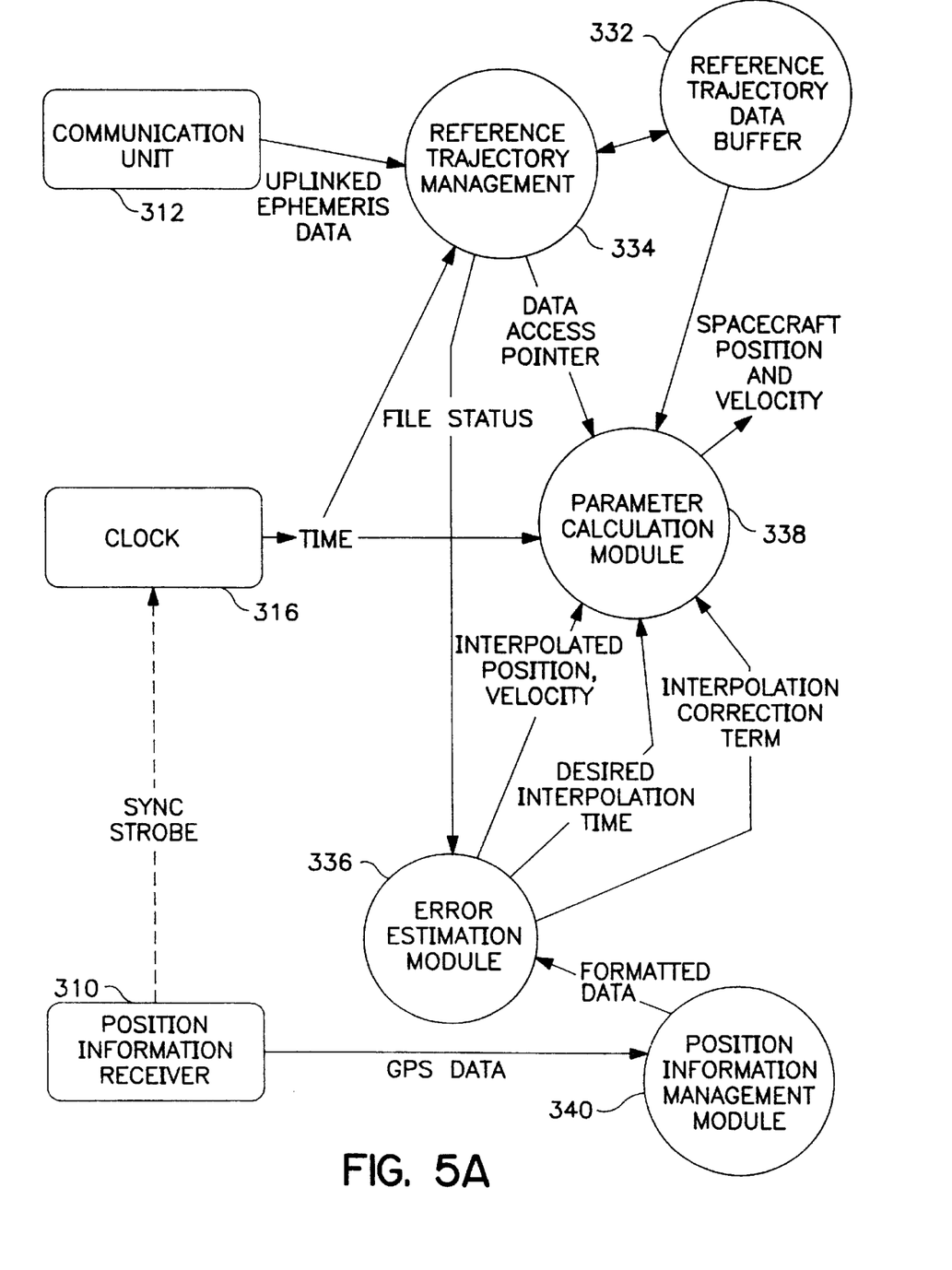
FIG. 5a is a schematic diagram illustrating a preferred data flow for orbital parameter correction in accordance with the present invention.

Referring now to FIG. 5a, a preferred data flow diagram for orbital parameter correction in accordance with the present invention is shown. The communications unit 312, clock 316 and position information receiver 310 provide data which is used by the reference trajectory management 334, error estimation 336, parameter calculation 338 and position information management 340 modules to correct the determination of spacecraft orbital parameters.

A strobe from the position information receiver 310 synchronizes the spacecraft clock 316 to the reference time used by the receiver 310. The position information management module 340 receives GPS data from the receiver 310 and conforms the data to a format which may be used by the other modules 334, 336, 338. Preferably, the formatted data comprises a measured spacecraft position and the time that the measured position is valid.

The reference trajectory management module 334 accesses reference trajectory data. Preferably, the reference trajectory data is ephemeris data comprising estimated spacecraft positions at discrete instants in time; and ephemerides are produced on the ground and uplinked to the spacecraft via radio frequency transmission, typically every day or two. Additionally, a series of ephemeris segments are preferably accessible and each segment spans a time interval at least as long as the interval between transmissions, so there is always a current reference trajectory onboard the spacecraft. The ephemeris data may be interpolated to provide a smooth estimate of the reference position at any desired time. The data may be uplinked through the communications unit 312 and stored in the data buffers 332. The reference trajectory management module 334 also provides a data access pointer for the parameter calculation module 338 and file status data for the error estimation module 336. The data access pointer indicates the current reference trajectory data (e.g. ephemeris A, ephemeris B, etc.) and its corresponding location in the data buffers 332 so that other modules such as the parameter calculation module 338 process the appropriate data. The file status signals indicate the currently processed reference trajectory data as well as the transition from current to new trajectory data (e.g. from ephemeris A to B).

The error estimation module 336 receives position information from module 340, the file status from the reference trajectory management module 334 and an interpolated position and velocity from the parameter calculation module 338. The error estimation module 336 compares the measured position data and the interpolated position and velocity data to provide an interpolation correction term to the parameter calculation module 338. Preferably, the in-track component of the difference between the measured and interpolated position of the spacecraft is used to calculate the interpolation correction term $\Delta t$, and the correction term is a time offset along an ephemeris trajectory. The determination of the correction term and the error estimation module 336 are shown and described in further detail with reference to FIG. 5b.

The parameter calculation module 338 receives reference trajectory data such as ephemeris data from the data buffers 332, the data access pointer from the reference trajectory management module 334, synchronized time from the clock 316 and the interpolation correction term and desired interpolation time signal from the error estimation module 336. The parameter calculation module 338 provides interpolated position and velocity data at the desired time and receives the interpolation correction term from the error estimation module 336. The parameter calculation module 338 uses the ephemeris data, synchronized time, and the interpolation correction term to calculate and output corrected spacecraft position and velocity. The data flow for interpolation is shown and described in further detail with reference to FIG. 5c.

Figure 5B:
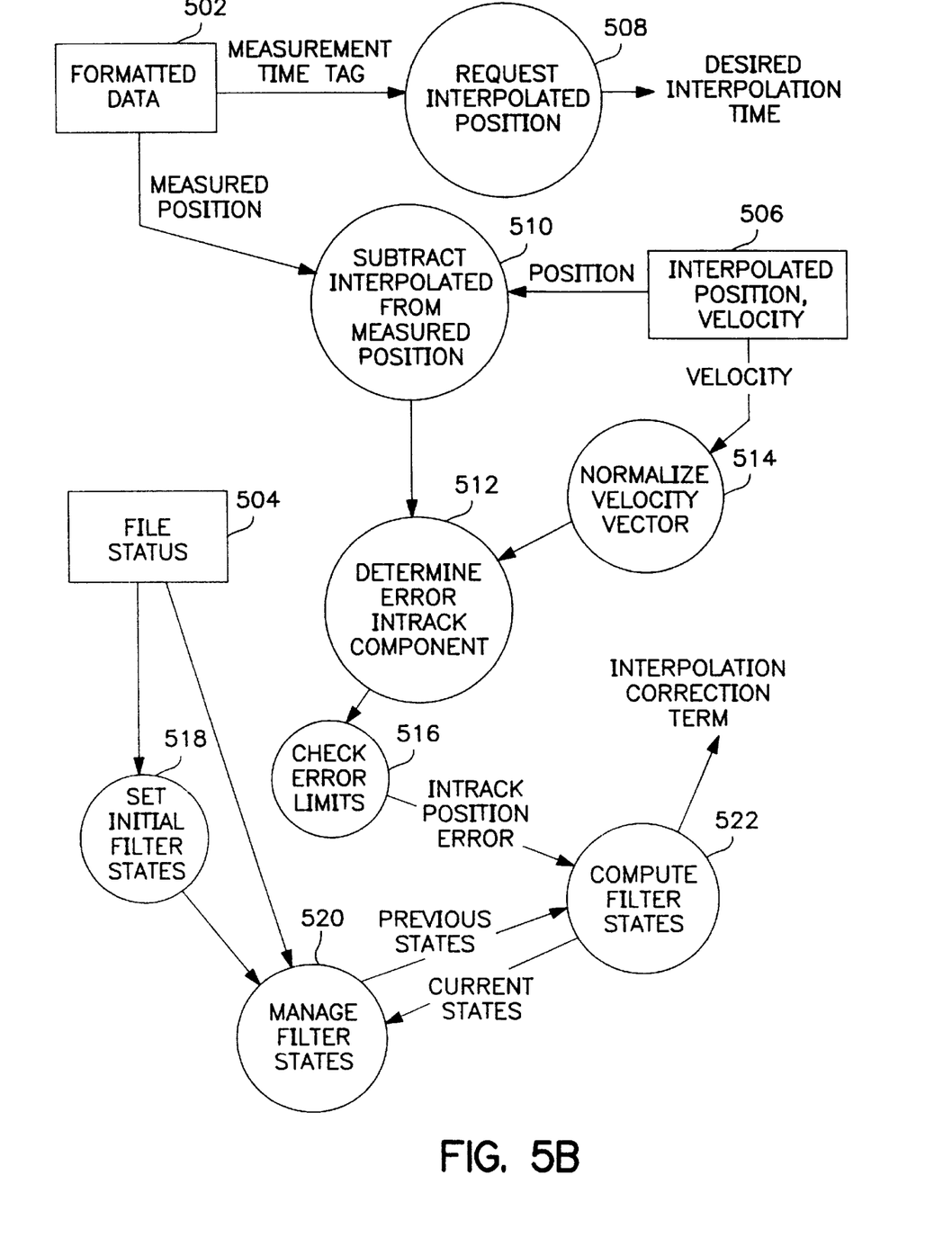
FIG. 5b is a schematic diagram illustrating a preferred data flow for an error estimation module in accordance with the present invention.

Referring now to FIG. 5b, a preferred data flow diagram for the error estimation module 336 is shown. The formatted data 502 comprises a measured position and a measurement time tag which identifies the time for which the measured position is valid. A routine to request 508 the interpolated position is used to generate the desired interpolation time signal for input to the parameter calculation module 338 which outputs the interpolated position and velocity 506. Preferably, the time for which the measured position is valid and the selected interpolation time are the same time $t_i$. The difference between the measured position and the interpolated position are then obtained 510 to provide a position error corresponding to time $t_i$. Vector representations of the measured and interpolated positions are used to calculate and provide the difference as a position error vector. Additionally, the vectors are preferably expressed in a common frame of reference such as WGS 84 so vector transformation is not required. A normalized 514 velocity vector based upon the interpolated velocity and the position error vector are used to determine 512 the in-track component of the position error $\Delta x$. For example, the in-track component may be approximated by taking the dot product of the position error vector and a vector parallel to the interpolated velocity. To discount anomalous GPS data, the in-track component $\Delta x$ of the position error for time $t_i$ is ignored if it exceeds a predetermined value 516 and, thus, a bounded in-track position error is provided. The bounded in-track position error $\Delta x$ for time $t_i$ is combined with filter states from a previous time step in a weighted average to compute 522 new filter states.

The filter states facilitate iterative determination of corrected parameters and include the interpolation correction term $\Delta t$ and the time rate of change $\Delta u$ of the correction term $\Delta t$. The filter states may be calculated at a fixed time interval equal to the time period between updated GPS measurements (typically 1 second).

Preferably, routines for computing 522 filter states implement the following equations:

$$\Delta t = \Delta t\_previous + T^*\Delta u + K1^*\Delta x, \qquad \text{(Equation 1)}$$

$$\Delta u = \Delta u\_previous + K2^*\Delta x. \qquad \text{(Equation 2)}$$

Thus, current filter states, $\Delta t$ and $\Delta u$, are calculated from previous values of the states and the current in-track position error $\Delta x$. Specifically, in equations 1 and 2, $\Delta t$ is the current interpolation correction term, Δu is the current time rate of change of the interpolation correction term, Δt_previous is the previous interpolation correction term, T is the time increment between calculations, and K1 and K2 are coefficients which are chosen to achieve a weighted average that dampens rapid changes in the in-track position error. Such selection provides filtering of anomalous GPS data in addition to that provided by the bounding routines 516.

The current interpolation correction term Δt is provided to the parameter calculation module 338 by the filter state computation 522 routines. Additionally, the current filter states are provided to routines which manage 520 the filter states for use in subsequent filtering. Generally, the calculation of filter states is iterative, so the previous filter states are set to the value of the current filter states:

$$\Delta t\_previous = \Delta t, \qquad \text{(Equation 3)}$$

$$\Delta u\_previous = \Delta u. \qquad \text{(Equation 4)}$$

Filter initialization routines 518 are used to initialize the filter states. The filter states may need to be initialized when data for setting the previous filter states is unavailable or where new reference trajectory data is being processed. Thus, initialization 518 is performed at activation and whenever a new ephemeris segment is used for interpolation. The file status signal 504 provided by the reference trajectory management module 334 indicates when to calculate initial states for the previous filter states.

For start up initialization, the difference between measured and interpolated positions may be used to calculate the initial states. The initial filter state calculations 518 provide the filter state management 520 routines with the filter state initial values. Specifically, Δt_previous is set to the initial interpolation correction term and Δu_previous is set to zero.

When the Reference Trajectory management 334 switches to a new ephemeris segment, various initialization 518 routines may be used, but, preferably, the initial states are calculated as follows:

1. A position for a selected time $t_{s1}$ is calculated from near the beginning of the new ephemeris segment.

2. The old ephemeris segment is used to calculate a position corresponding to the same time $t_{s1}$. The position is calculated using the correction term Δt from the current filter states 522.

3. The difference between the calculated positions for the new and old segments divided by estimated orbital velocity, is used to estimate a first interpolation correction term for the new segment.

4. Steps 1–3 are then repeated for a different selected time $t_{s2}$ to provide a second interpolation correction term for the new segment. The initial rate of change Δu is estimated from the difference between the first and second correction terms divided by the difference between times $t_{s1}$ and $t_{s2}$.

Figure 5C:
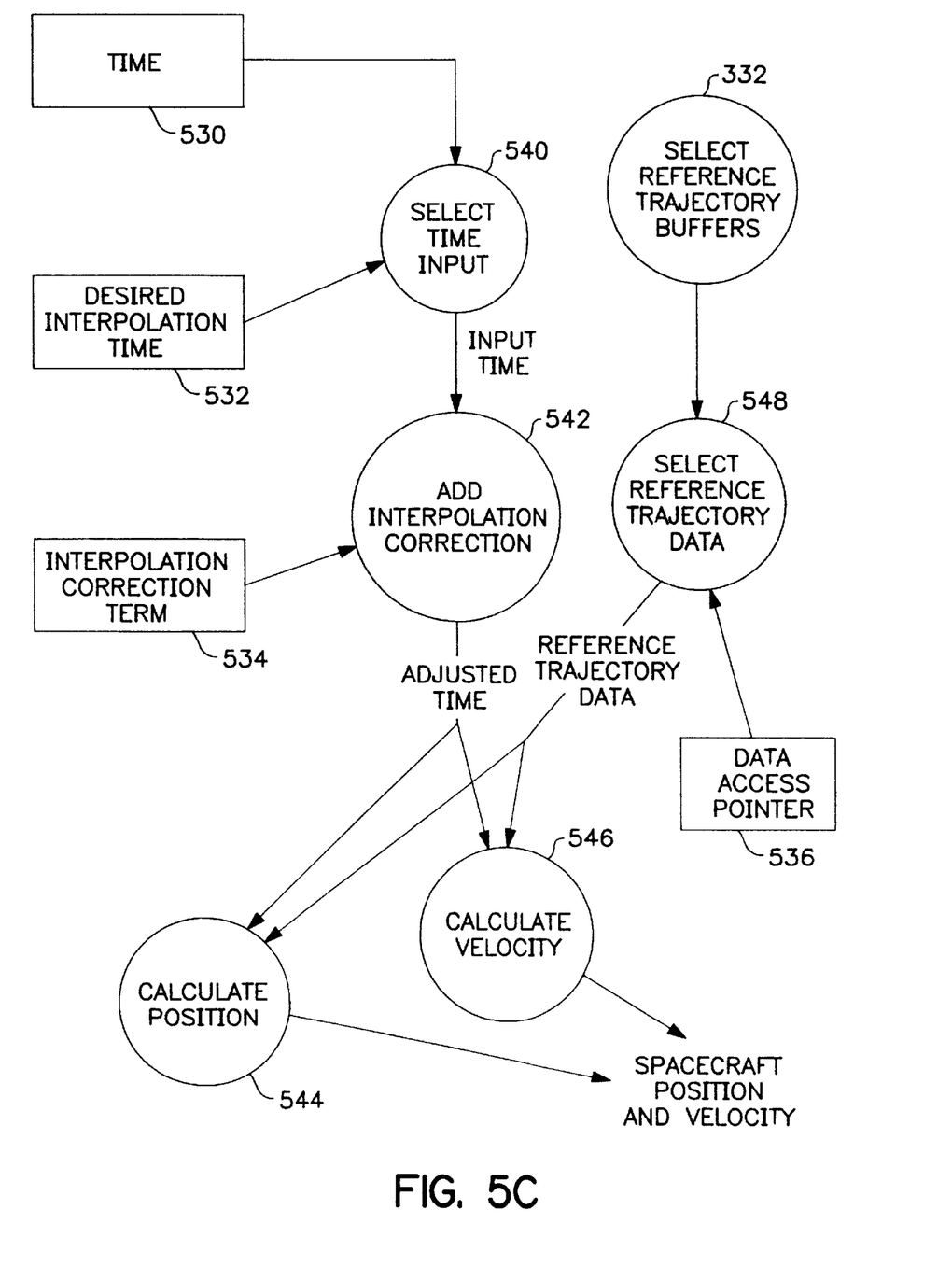
FIG. 5c is a schematic diagram illustrating a preferred data flow for a parameter calculation module in accordance with the present invention.

Referring now to FIG. 5c, a preferred data flow diagram for the parameter calculation module 338 is shown. Preferably, position is interpolated as a function of time. The input time is selected 540 from the time 530 provided by the computer system clock 316 or another desired interpolation time 532 such as GPS measurement time. The input time is then adjusted 542 using the interpolation correction term Δt provided by the error estimation module 336. The adjusted time is used to select 548 a subset of the current ephemeris as designated by the data access pointer 536.

The spacecraft position and velocity are calculated 544, 546 by interpolating the selected 548 subset of ephemeris data using an interpolation scheme. The interpolation scheme is chosen to provide interpolation errors which are small compared to the GPS measurement errors. Various conventional ephemeris interpolation schemes may be used. The routines for calculating spacecraft position 544 and velocity 546 use the scheme and the adjusted time to output corrected position $r_E$ and velocity $v_E$ vectors.

The routines for calculating the position 544 and velocity 546 of the spacecraft may also use the rate of change Δu of the interpolation correction term Δt to further improve interpolation accuracy. Specifically, the fractional change in the semi-major axis Δa/a would be computed from Δu using:

$$\Delta a/a = 2\Delta u/3 \qquad \text{(Equation 5)}$$

Then, final vectors $r_F$ and $v_F$ can be determined from corrected position $r_E$ and velocity $v_E$ vectors using the following equations:

$$r_F = r_E(1+\Delta a/a), \qquad \text{(Equation 6)}$$

$$v_F = v_E(1-0.5\Delta a/a). \qquad \text{(Equation 7)}$$

These final vectors may be calculated and output by the parameter calculation module 338. The final vectors may also be used as the corrected vectors by the error estimation module 336 in the iterative determination of an interpolation correction term.

Figure 6:
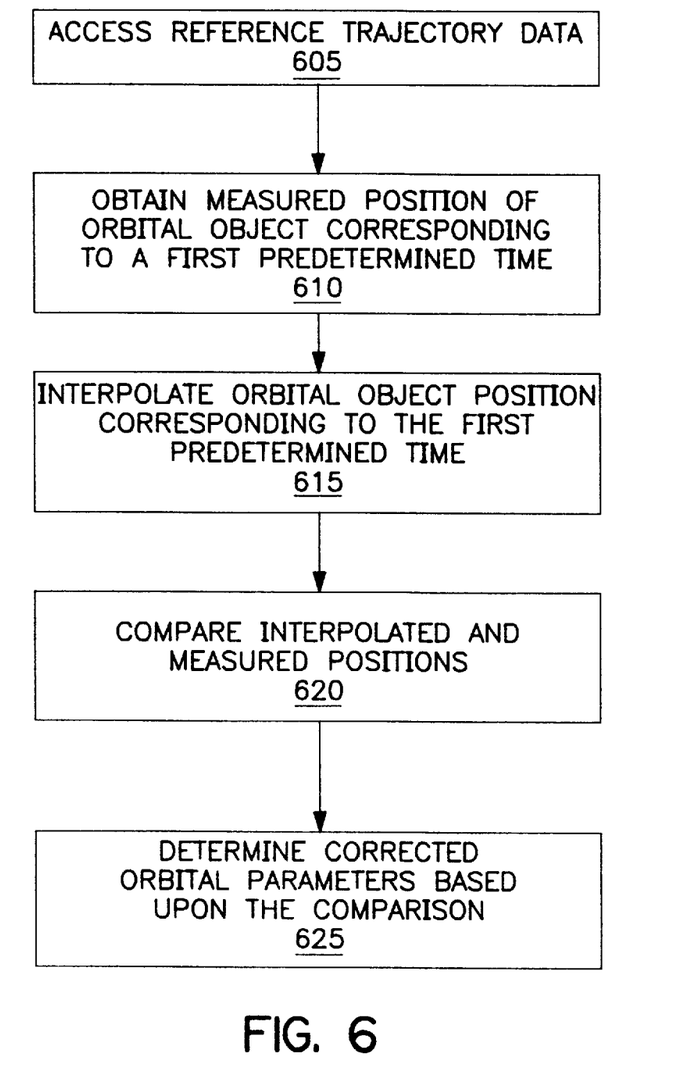
FIG. 6 is a flow chart illustrating a preferred method for the correction of orbital parameters in accordance with the present invention.

Referring now to FIG. 6, a flow chart illustrating a preferred embodiment of a method for correcting orbital parameters of an orbital object initially accesses 605 reference trajectory data such as ephemeris data which is uplinked from a ground source. A measured position of the orbital object corresponding to the first time is obtained 610 and then the reference trajectory data is used to calculate 615 the position of the orbital object corresponding to the first time. Preferably, the determination is based upon interpolation using the reference trajectory data. Thus, a measured position and an interpolated position for the same time are provided and may be compared 620 to determine the difference between them. The positional difference may be smoothed using a weighted average. Corrected orbital parameters may then be determined 625 based upon the comparison of the measured and determined positions.

Combining accurate reference trajectory data such as ephemeris data with position information such as GPS measurement data provides very accurate orbital parameter determination because slow interpolation degradation may be compensated for by comparison to measured position information. Additionally, position information errors may be discounted or buffered via comparison to the reference trajectory data. Thus, since the scheme may be implemented using fairly simple software, computational overhead is lowered and real-time on-board processing is facilitated. Additionally, ephemeris trajectory degradation and navigational errors associated with maneuvering and S/A are prevented.

Although the present invention has been described above in terms of specific embodiments, it is anticipated that alteration and modifications thereof will no doubt become apparent to those skilled in the art. It is therefore intended that the following claims be interpreted as covering all such alterations and modifications as falling within the true spirit and scope of the invention.

We claim:

1. In a system including a processor and a memory a method for real time on-board determination of corrected spacecraft orbital parameters, said method comprising:

obtaining a reference trajectory for the spacecraft based upon reference trajectory data provided from a source external to the spacecraft;

obtaining a measured position of the spacecraft corresponding to a first time:

calculating a position of the spacecraft along the reference trajectory which corresponds to the first time:

comparing the measured position and the calculated position corresponding to the first time:

determining a position error as a result of the camparison between the measured position and the calculated position corresponding to the first time;

determining an in-track component of the position error as a portion of the position error that is parallel to the reference trajectory;

determining a time correction term based upon the in-track component of the position error; and calculating corrected orbital parameters on-board the spacecraft using the determined time correction term.

2. The method of claim 1, wherein the calculation of corrected orbital parameters includes computing the position of the spacecraft along the reference trajectory using a first time plus the time correction term.

3. The method of claim 2, wherein the calculation of corrected orbital parameters includes computing the velocity of the spacecraft using the first time plus the time correction term.

4. The method of claim 3, further comprising:

iteratively calculating the time correction term using a position error which is determined at discrete time intervals.

5. The method of claim 4, further comprising:

determining a rate of change of the time correction term.

6. The method of claim 5, further comprising:

using the rate of change of the time correction term to correct a calculated spacecraft position component of the calculated corrected spacecraft orbital parameters.

7. The method of claim 6, further comprising:

using the rate of change of the time correction term to correct a calculated spacecraft velocity component of the calculated corrected spacecraft orbital parameters.

8. An apparatus for accurately determining the orbital parameters of a spacecraft using reference trajectory data and position information, the apparatus comprising:

a position information management module, for providing a measured spacecraft position corresponding to a first time;

a reference trajectory management module, for obtaining a reference trajectory for the spacecraft from a source external to the spacecraft;

a parameter calculation module, in communication with the reference trajectory management module, for determining the position of the spacecraft along the reference trajectory which corresponds to the first time; and an error estimation module, in communication with the position information management module, the reference trajectory management module, and the parameter calculation module, for comparing the measured position and the calculated position corresponding to the first time, determining a position error as the difference between the measured position and the calculated position corresponding to the first time, determining an in-track component of the position error as a portion of the position error that is parallel to the reference trajectory, providing time correction terms based upon the in-track component of the position error, and for calculating corrected orbital parameters based on the time correction terms.

9. A system for on-board accurate determination of orbital parameters of a spacecraft using reference trajectory data and position information, the system comprising:

a communications unit, for obtaining a reference trajectory for the spacecraft from a source external to the spacecraft;

a position information receiver, for receiving position information including a measured position of the spacecraft which corresponds to a first time;

a memory, in communication with the communications unit and the position information receiver, for storing the reference trajectory and the position of the spacecraft which corresponds to the first time; and a central processing unit connected to the memory for determining a position of the spacecraft along the reference trajectory which corresponds to the first time, comparing the measured position and the determined position which correspond to the first time, wherein the comparison includes determining a position error as the difference between the measured position and the determined position corresponding to the first time, determining an in-track component of the position error as a portion of the position error that is parallel to the reference trajectory. and determining corrected orbital parameters based upon the comparison and the determined in-track component of the position error.

* * * * *